Figure 1:
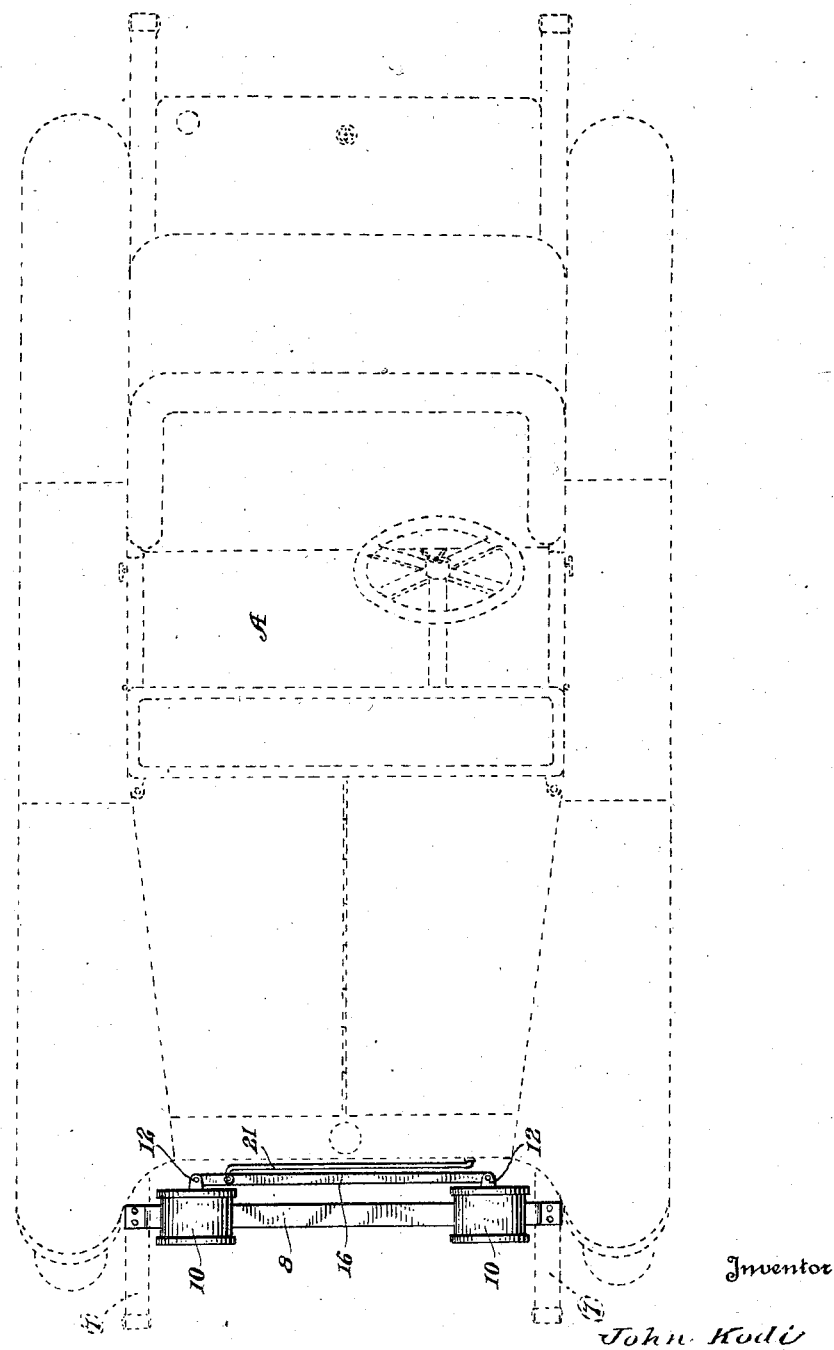

July 28, 1925.  
J. KODI  
DIRIGIBLE HEADLIGHT  
Filed Sept. 24, 1924  
1,547,499  
2 Sheets-Sheet 1

Inventor  
John Kodi  
By Bryant & Lowry  
Attorneys

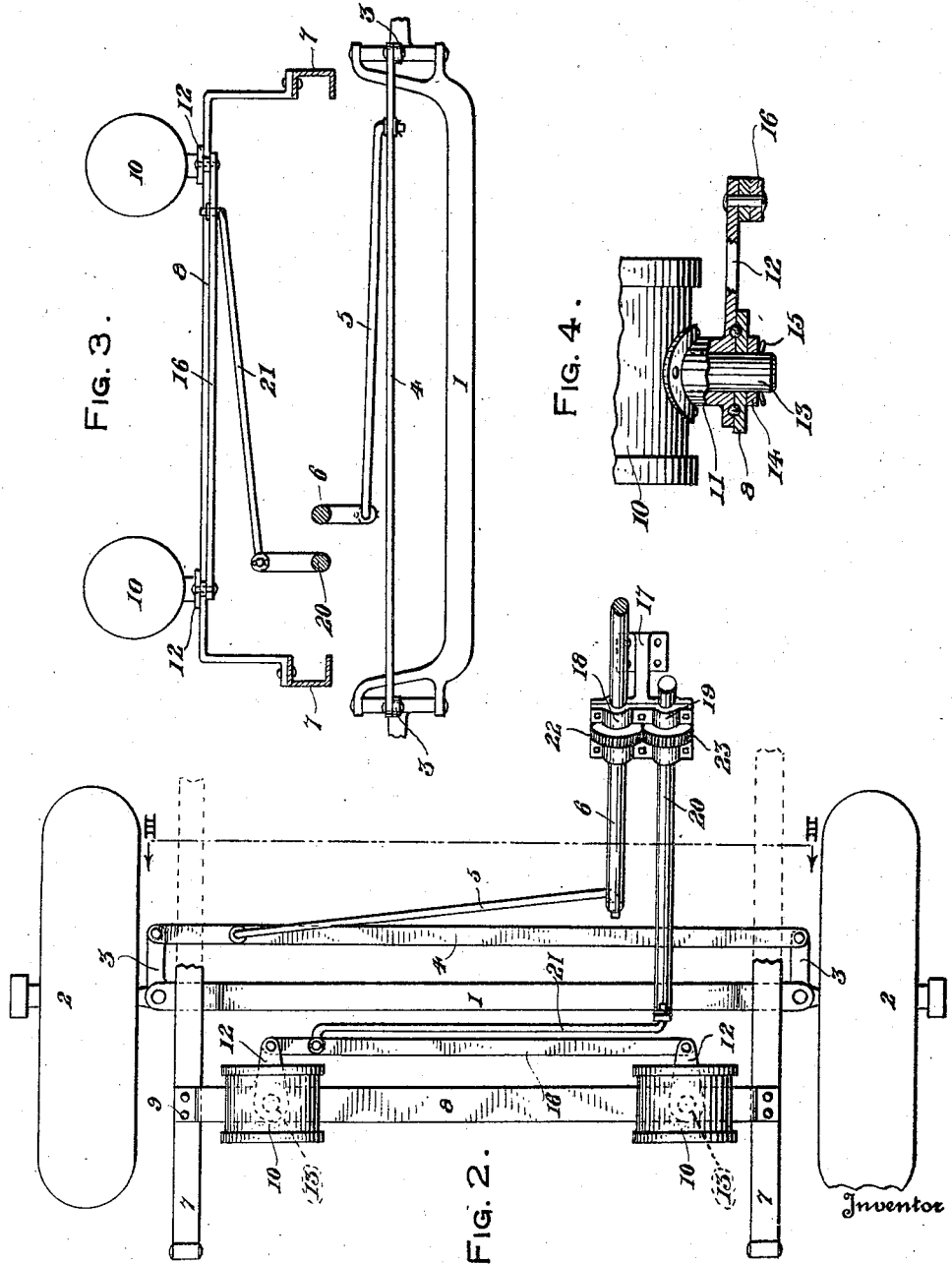

Patented July 28, 1925.

1,547,499

UNITED STATES PATENT OFFICE.

JOHN KODI, OF BOLTZ, PENNSYLVANIA.

DIRIGIBLE HEADLIGHT.

Application filed September 24, 1924. Serial No. 739,591.

*To all whom it may concern:*

Be it known that I, JOHN KODI, a citizen of Hungary, residing at Boltz, in the county of Indiana and State of Pennsylvania, have invented certain new and useful Improvements in Dirigible Headlights, of which the following is a specification.

This invention relates to certain new and useful improvements in dirigible headlights especially designed for use in connection with automobiles wherein the side headlights of the automobile are mounted in a manner and connected to the steering mechanism to cause the same to be shifted or turned to either the right or left when the front wheels of the automobile are correspondingly turned, for casting the light rays to either side of the road.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 diagrammatically illustrates by dotted lines, a top plan view of an automobile with the dirigible headlight mechanism mounted thereon, Figure 2 is a top plan view showing the headlight mechanism connected to the steering devices, Figure 3 is a vertical cross-sectional view taken on line III—III of Fig. 2, and Figure 4 is a detail elevational view, partly in section showing the mounting of one of the dirigible headlights upon the cross bar that extends between the side rails of the automobile chassis.

The automobile A illustrated by dotted lines in Fig. 1 includes the front axle 1 having the front steering wheels 2 connected to the steering knuckles 3 that in turn are connected by the steering rod 4 that has a link connection 5 with the depending arm 6ª of the steering post 6.

The side bars 7 of the automobile chassis support the opposite ends of the cross bar 8 which are angularly bent downwardly as illustrated in Fig. 3 and secured to the side bars as at 9, the cross bar 8 being positioned forwardly of the automobile radiator as illustrated in Fig. 1. A headlight 10 is rotatably supported above and adjacent each end of the cross bar 8 and includes a hub portion 11 secured to the under side of the lamp casing with a rearwardly directed arm 12. The hub portion 11 encloses a spindle 13 that extends downwardly through the cross bar 8 and receives a washer 14 upon the lower end thereof that is secured thereon by the cotter 15, the lower end of the hub portion 11 and the rearwardly directed arm 12 flatly engaging the upper face of the cross bar 8. The rear ends of the arms 12 are connected by the cross rod 16 to cause the same to be simultaneously moved.

As shown in Fig. 2, a bracket 17 is provided with two bearing portions 18 and 19, the bearing 18 forming a support for the steering post 6 while the bearing 19 forms a support for the rod 20, the forward end of the rod 20 having the perpendicularly extending arm 20ª connected to a link connection 21 which has a connection with the cross rod 16. The gear 22 fixed to the steering post 6 within the bearing 18 meshes with the gear 23 upon the rod 20 so that motion of the steering post 6 is communicated to the rod 20.

It will therefore be seen that when the steering post 6 is operated for shifting the front steering wheels 2 to change the direction of travel thereof, the rod 20 is simultaneously rotated and by its link connection 21 with the cross rod 16 of the dirigible headlight mechanism, the headlights 10 are correspondingly shifted to cause the light rays to travel directly forwardly of the automobile and in the path of travel thereof.

While there is herein shown and described the preferred embodiment of the present invention, it is nevertheless to be understood that minor changes may be made therein without departing from the spirit and scope of the invention as claimed.

What is claimed as new is:—

A device of the type described, in combination, a pair of pivotal wheel axles, an arm extending rearwardly from each axle, a cross rod connecting the ends of the arms, a pair of pivotal headlights, an arm extending rearwardly from each headlight, a cross rod connecting the ends of the headlight arms and arranged in parallelism with the first mentioned cross rod, a dual bearing bracket, a steering post journaled in one of said bearings, a rod journaled in the other of said bearings and extending in parallelism with the steering post, intermeshing gears mounted on said post and rod, an arm depending from the free end of the post, a link connection between the last mentioned arm and the cross rod which connects the axle arms, an arm extending perpendicularly from the free end of the rod, and a link connection between the last mentioned arm and the cross rod which connects the headlights, whereby rotation of the steering post and rod in opposite directions will cause the headlights to turn in synchronism with the axle.

In testimony whereof I affix my signature.

JOHN KODI.